(12) United States Patent
Wang et al.

(10) Patent No.: US 7,775,778 B2
(45) Date of Patent: Aug. 17, 2010

(54) HEAT DISSIPATION MODULE

(75) Inventors: Shaw-Fuu Wang, Taipei (TW);
Ting-Chiang Huang, Taipei (TW);
Shih-Chen Shen, Taipei (TW);
Sheng-Jie Syu, Taipei (TW)

(73) Assignee: Inventec Corporation, Taipei (TW)

( * ) Notice: Subject to any disclaimer, the term of this patent is extended or adjusted under 35 U.S.C. 154(b) by 569 days.

(21) Appl. No.: 11/849,746

(22) Filed: Sep. 4, 2007

(65) Prior Publication Data

US 2009/0004963 A1 Jan. 1, 2009

(30) Foreign Application Priority Data

Jun. 29, 2007 (TW) .............................. 96123763 A

(51) Int. Cl.
*F04B 19/00* (2006.01)
*H05K 5/00* (2006.01)

(52) U.S. Cl. ...................... 417/420; 454/184
(58) Field of Classification Search ................. 454/184, 454/254; 335/68; 417/410.1
See application file for complete search history.

(56) References Cited

U.S. PATENT DOCUMENTS

| 2009/0047152 A1* | 2/2009 | Huang et al. ............. 417/410.1 |
| 2009/0155049 A1* | 6/2009 | Woodard et al. ............ 415/104 |
| 2010/0041327 A1* | 2/2010 | Desler ......................... 454/184 |
| 2010/0101097 A1* | 4/2010 | Thien ........................... 30/276 |

* cited by examiner

*Primary Examiner*—Steve McAllister
*Assistant Examiner*—Helena Kosanovic
(74) *Attorney, Agent, or Firm*—J.C. Patents

(57) ABSTRACT

A heat dissipation module including a supporting frame, a driver, a linkage, a first magnet and a plurality of magnetic blades is provided. The supporting frame has a chute. Moreover, one end of the linkage has a protrusion passing through the chute. The other end of the linkage is connected to the driver. The first magnet is disposed on the protrusion. In addition, the repelling magnetic blades are pivoted on the supporting frame. The outermost magnetic blade faces the first magnet and they repel each other.

6 Claims, 1 Drawing Sheet

HEAT DISSIPATION MODULE

CROSS-REFERENCE TO RELATED APPLICATION

This application claims the priority benefit of Taiwan application serial no. 96123763, filed on Jun. 29, 2007. All disclosure of the Taiwan application is incorporated herein by reference.

BACKGROUND OF THE INVENTION

1. Field of the Invention

The present invention generally relates to a heat dissipation module, and more particularly, to a heat dissipation module occupying smaller space.

2. Description of Related Art

In recent years, with advancements of computer science and technology, the heat generated by electronic devices inside of a computer is increased while the computer runs more efficiently. To protect the electronic devices from being overheated, which would otherwise result in temporarily or even permanent damage of the electronic devices, several dissipation fan devices are usually provided inside the computer to produce active airflow in order to rapidly dissipate heat produced by the electronic devices to the external environment.

As far Ultra Mobile PC (UMPC) is concerned, for instance, the temperature of its central processing unit (CPU), south bridge and north bridge is not easily to get overheated. However, due to compact interior space of the UMPC, high temperature produced by the interior electronic devices makes the surface of the UMPC get overheated easily. On the other hand, it's difficult to mount a conventional dissipation fan device in the interior of the UMPC, because the UMPC has a rather small interior space. Furthermore, the conventional dissipation fan device is noisy and energy consuming, resulting in difficulties in meeting requirements of the UMPC. Hence, there is a need to improve the conventional heat dissipation module.

SUMMARY OF THE INVENTION

Accordingly, the present invention is directed to a heat dissipation module which has relatively smaller size, lower noise and consume less energy.

According to an embodiment of the present invention, a heat dissipation module is provided. The heat dissipation module comprises a supporting frame having a chute, a driver, a linkage, a first magnet disposed on a protrusion of the chute and a plurality of magnetic blades pivoted on the supporting frame that magnetically repel one another. One end of the linkage has a protrusion passing through the chute, and the other end of the linkage is connected to the driver. An outermost magnetic blade faces and magnetically repels the first magnet.

According to an embodiment of the present invention, the heat dissipation module further comprises a second magnet, and the magnetic blades are disposed between the first and second magnet, wherein the second magnet disposed on the supporting frame magnetically repulses the other outermost magnetic blade.

In an embodiment of the present invention, the linkage further comprises a sleeve sheathing the protrusion, and the first magnet is disposed on the sleeve.

In an embodiment of the present invention, each of the magnetic blades may comprise a plate pivoted to the supporting frame and a third magnet disposed on the plate.

In an embodiment of the present invention, the plate may be comprised of plastic.

In an embodiment of the present invention, the driver may be comprised of a motor.

The heat dissipation module according to the present invention uses a driver to drive the first magnet on the linkage, and magnetic repulsion is used to reciprocately rotate the magnetic blades to generate an air flow to dissipate heat. Since the magnetic blades are pushed by magnetic repulsion, the heat dissipation module according to the present invention is capable of preventing the mechanical components from being subjected to friction and has an advantage of having low-noise.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
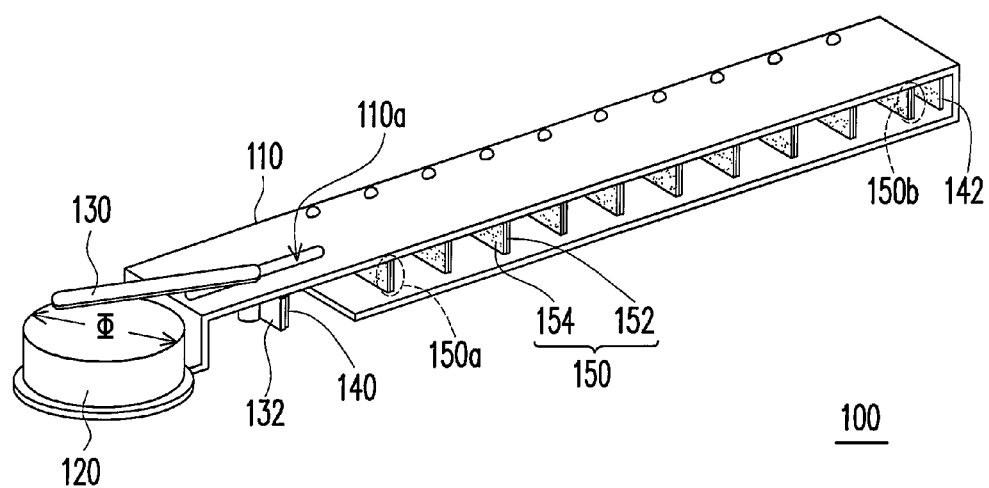
FIG. 1 is a schematic perspective view of a heat dissipation module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
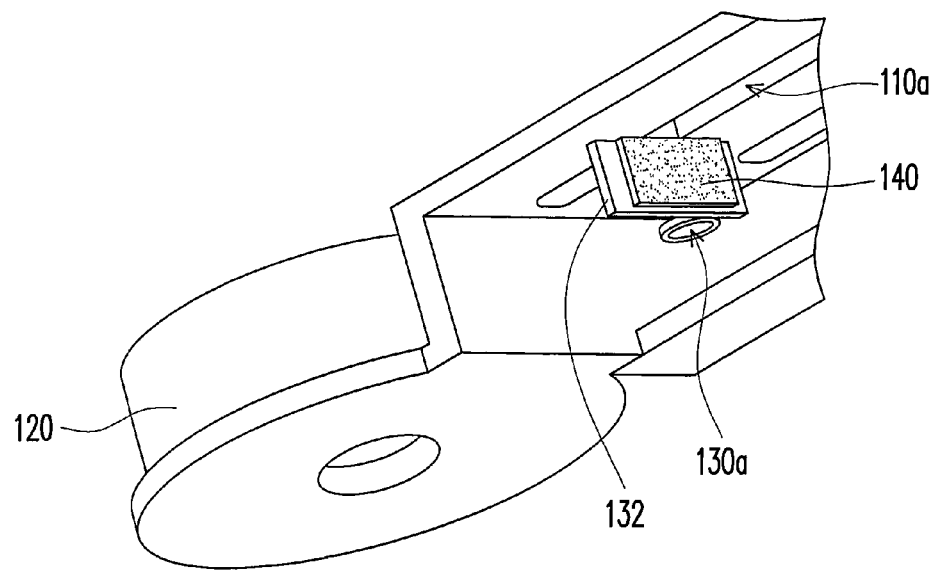
FIG. 2 is a partially enlarged view of a heat dissipation module according to an embodiment of the present invention.

FIG. 1 is a schematic perspective view of a heat dissipation module according to an embodiment of the present invention, and FIG. 2 is a partially enlarged view of the heat dissipation module according to an embodiment of the present invention. Referring to FIG. 1 and FIG. 2, the heat dissipation module 100 in accordance with the present invention, includes a supporting frame 110, a driver 120, a linkage 130, a first magnet 140 and a plurality of magnetic blades 150. The supporting frame 110 comprises a chute 110a. The heat dissipation module 100 in accordance with the present invention may be mounted inside an interior of an Ultra Mobile PC (UMPC). However, this is only an example for illustration purpose, and the present invention is not limited thereto. Those skilled in the art may modify the shape of the supporting frame 110, depending on the interior space of the UMPC in order to achieve the purpose and advantages of the presention, which shall also construed to be within the scope of the present invention.

As shown in FIG. 2, an end of the linkage 130 has a protrusion 130a passing through the chute 110a. In order to firm engage the first magnet 140 with the protrusion 130a, the linkage 130 further includes a sleeve 132 sheathing the protrusion 130a and the first magnet 140 is positioned on the sleeve 132. Alternatively, the first magnet may be engaged directly with the protrusion 130a of the end of the linkage 130, without use of the sleeve 132. The present invention should not be limited thereto.

The other end of the linkage 130 is connected to the driver 120, as shown in FIG. 1. In particular, the driver 120 may include a motor. Since the temperature of electronic devices inside of the UMPC do not easily get overheated, it is unnecessary to use a driver with a high rotation speed. Therefore, the heat dissipation module 100 of the present invention may have the advantage low noise and low energy consumption. However, due to the rather limited space in the interior of the UMPC, the size of the driver 120 may be adapted to be mounted in the UMPC. In one embodiment, the motor is a stepping motor. Preferably, the driver 120 has a diameter Φ of, for example, 7.9 mm.

In addition, the magnetic blades 150 may be pivoted on the supporting frame 110 and repel one another. The outermost magnetic blade 150a faces the first magnet 140 and they magnetically repel each other. In addition, the heat dissipation module 110 further includes a second magnet 142 which is preferably disposed on the supporting frame 110. The magnetic blades 150 are positioned between the first and second magnets 140 and 142. The second magnet 142 positioned on the supporting frame 110 magnetically repel the other outermost magnetic blade 150b. In a preferred embodiment, each magnetic blade 150 includes a plate 152 and a third magnet 154. The plate 152 is pivoted on the supporting frame 110. The third magnet 154 is provided on the plate 152. In practice, the plate 152 may be comprised of plastic. However, the present invention does not limit the material of the plate 152 to be plastic as such. Those skilled in the art would know that the magnetic blade 150 can be made of only magnet.

In detail, the driver 120 drives the linkage 130, and then the first magnet 140 on the linkage 130 reciprocately moves along the chute 110a. Since the outermost magnetic blade 150a faces the first magnet 140 and they magnetically repel each other, the first magnet 140 pushes the magnetic blade 150 by magnetic repulsion. In such a way, the outermost magnetic blade 150a in turn repels the neighboring magnetic blade via magnetic repulsion.

When the first magnet 140 driven by the linkage 130 reciprocately moves, the magnetic blades 150 between the first magnet 140 and the second magnet 142 reciprocately move to generate an uniform airflow to dissipate heat. Since the magnetic blades 150 are pushed by the magnetic repulsion happening between the magnetic blades 150 and the first magnet 140 and the magnetic repulsion happening between the magnetic blades 150 and the second magnet 142, the wear of the mechanical components of the heat dissipation module 100 according to the present invention may be prevented and the noise of the heat dissipation module 100 can be further reduced.

As described above, the heat dissipation module according to the present invention employs a driver to drive the first magnet on the linkage, and magnetic repulsion is used to make the magnetic blades move reciprocately to generate an air flow to achieve heat dissipation. Since the magnetic blades are pushed by magnetic repulsion, the heat dissipation module according to the present invention may prevent the mechanical components from friction and gain the advantage lower-noise. Furthermore, it is not necessary for the heat dissipation module according to the present invention to use a driver with high rotation speed. Thus, the heat dissipation has the advantage of low energy consumption and small size.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat dissipation module, comprising:
    a supporting frame having an air passage there through, said supporting frame, having a slot;
    a driver;
    a linkage, one end of the linkage having a protrusion passing through the slot, and another end of the linkage being connected to the driver;
    a first magnet, disposed on the protrusion passing through the slot; and
    a plurality of magnetic blades, pivoted on the supporting frame and magnetically repelling one another;
    wherein an outermost magnetic blade closest to the first magnet faces and magnetically repels the first magnet, such that as the first magnet moves along the slot the plurality of magnetic blades pivots.

2. The heat dissipation module according to claim 1, further comprising a second magnet, and the magnetic blades being disposed between the first and second magnets, wherein the second magnet disposed on the supporting frame magnetically repels an outermost magnetic blade closest to the second magnet.

3. The heat dissipation module according to claim 1, wherein the linkage further comprises a sleeve sheathing the protrusion, and the first magnet is disposed on the sleeve.

4. The heat dissipation module according to claim 1, wherein each of the magnetic blades comprises a plate pivoted to the supporting frame and a third magnet disposed on the plate.

5. The heat dissipation module according to claim 4, wherein the plate comprises plastic.

6. The heat dissipation module according to claim 1, wherein the driver comprises a motor.

\* \* \* \* \*